(12) United States Patent
Zhu et al.

(10) Patent No.: US 11,968,459 B2
(45) Date of Patent: Apr. 23, 2024

(54) SYSTEMS AND METHODS FOR AUTOMATIC EXPOSURE CONTROL

(71) Applicant: ZHEJIANG DAHUA TECHNOLOGY CO., LTD., Zhejiang (CN)

(72) Inventors: Peng Zhu, Hangzhou (CN); Xingjian Zheng, Hangzhou (CN); Guangxiu Yao, Hangzhou (CN); Wei Fang, Hangzhou (CN); Yinchang Yang, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 232 days.

(21) Appl. No.: 17/643,834

(22) Filed: Dec. 12, 2021

(65) Prior Publication Data
US 2022/0103740 A1    Mar. 31, 2022

Related U.S. Application Data

(63) Continuation of application No. PCT/CN2019/126494, filed on Dec. 19, 2019.

(30) Foreign Application Priority Data

Jun. 14, 2019   (CN) .......................... 201910517324.5

(51) Int. Cl.
*H04N 23/73*   (2023.01)
*G06T 7/00*   (2017.01)
*H04N 23/71*   (2023.01)

(52) U.S. Cl.
CPC .............. *H04N 23/73* (2023.01); *G06T 7/97* (2017.01); *H04N 23/71* (2023.01); *G06T 2207/20021* (2013.01)

(58) Field of Classification Search
CPC ...... H04N 23/73; H04N 23/71; H04N 23/741; G06T 7/97; G06T 2207/20021
See application file for complete search history.

(56) References Cited

U.S. PATENT DOCUMENTS

| 9,363,446 B2 | 6/2016 | Feng et al. |
| 2009/0086061 A1 | 4/2009 | Asoma |

(Continued)

FOREIGN PATENT DOCUMENTS

| CN | 104917976 A | 9/2015 |
| CN | 105323493 A | 2/2016 |

(Continued)

OTHER PUBLICATIONS

International Search Report in PCT/CN2019/126494 dated Mar. 20, 2020, 4 pages.

(Continued)

*Primary Examiner* — Yogesh K Aggarwal
(74) *Attorney, Agent, or Firm* — METIS IP LLC

(57) ABSTRACT

The present disclosure relates to systems and methods for automatic exposure control. The methods may include obtaining a first frame and a second frame of a current scene from a camera, wherein a ratio of a first exposure time of the first frame to a second exposure time of the second frame is a first exposure ratio; obtaining a first average luminance of a brightest region in the second frame; obtaining a second average luminance of a darkest region in the first frame; and determining a dynamic range of the current scene based on the first exposure ratio, the first average luminance, and the second average luminance.

18 Claims, 12 Drawing Sheets

(56) References Cited

U.S. PATENT DOCUMENTS

| | | | |
|---|---|---|---|
| 2011/0090361 A1* | 4/2011 | Kobayashi | H04N 25/583 |
| | | | 348/222.1 |
| 2014/0022408 A1 | 1/2014 | Nashizawa | |
| 2014/0078170 A1 | 3/2014 | Ohki | |
| 2015/0221095 A1 | 8/2015 | Tanaka et al. | |
| 2016/0352995 A1 | 12/2016 | Min et al. | |
| 2018/0191949 A1 | 7/2018 | Li et al. | |

FOREIGN PATENT DOCUMENTS

| | | | |
|---|---|---|---|
| CN | 105827995 A | 8/2016 | |
| CN | 105898148 A | 8/2016 | |
| CN | 106791470 A | 5/2017 | |
| CN | 106791475 A | 5/2017 | |
| CN | 107197167 A | 9/2017 | |
| CN | 107370910 A | 11/2017 | |
| CN | 107438163 A | 12/2017 | |
| CN | 108564558 A | 9/2018 | |
| WO | 2018077156 A1 | 5/2018 | |
| WO | 2020248564 A1 | 12/2020 | |

OTHER PUBLICATIONS

Written Opinion in PCT/CN2019/126494 dated Mar. 20, 2020, 5 pages.

First Office Action in Chinese Application No. 201910517324.5 dated Feb. 3, 2020, 14 pages.

The Extended European Search Report in European Application No. 19932929.3 dated May 4, 2022, 8 pages.

* cited by examiner

SYSTEMS AND METHODS FOR AUTOMATIC EXPOSURE CONTROL

CROSS-REFERENCE TO RELATED APPLICATIONS

This application is a continuation of International Application No. PCT/CN2019/126494, filed on Dec. 19, 2019, which claims priority of Chinese Application No. 201910517324.5, filed on Jun. 14, 2019, the contents of which are incorporated herein in its entirety by reference.

TECHNICAL FIELD

The present disclosure generally relates to video surveillance fields, and more particularly, to systems and methods for automatic exposure control.

BACKGROUND

With the developments of video surveillance and surveillance cameras, automatic exposure technology is widely used in indoor control systems, secure-access systems, and information collection systems, etc. The automatic exposure technology usually evaluates luminance of a current scene, and dynamically adjusts exposure parameters, such as shutters, apertures, gains, etc., to keep appropriate luminance of images of the current scene. Some existing methods for evaluating the luminance of the current scene often use only one frame of the current scene without considering other frames. However, the exposure parameters are only appropriate for the only one frame and are inappropriate for the other frames. Some other existing methods usually use a constant exposure ratio of a long-exposure frame to a short-exposure frame to determine dynamic ranges for different scenes. However, the constant exposure ratio cannot match with the different scenes and results in increasing synthetic noise and poor image quality. Thus, it is desirable to provide systems and methods for automatic exposure control with low synthetic noise and good image quality.

SUMMARY

An aspect of the present disclosure introduces a system for automatic exposure control. The system may include at least one storage medium including a set of instructions for automatically adjusting exposure parameters of a camera, and at least one processor in communication with the storage medium. When executing the set of instructions, the at least one processor may perform the following operations. The at least one processor may obtain a first frame and a second frame of a current scene from a camera, wherein a ratio of a first exposure time of the first frame to a second exposure time of the second frame is a first exposure ratio; obtain a first average luminance of a brightest region in the second frame; obtaining a second average luminance of a darkest region in the first frame; and determine a dynamic range of the current scene based on the first exposure ratio, the first average luminance, and the second average luminance.

In some embodiments, the at least one processor may further obtain a high average luminance of a high luminance region, a medium average luminance of a medium luminance region, and a low average luminance of a low luminance region in the first frame; obtain an overexposure degree of the second frame; and determine a total luminance result of the current scene based on the dynamic range, the high average luminance, the medium average luminance, the low average luminance, and the overexposure degree.

In some embodiments, the at least one processor may further divide the first frame into a plurality of blocks; determine an average luminance of each of the plurality of blocks; and obtain the high luminance region, the medium luminance region, and the low luminance region based on the average luminance of each of the plurality of blocks.

In some embodiments, to obtain the overexposure degree, the at least one processor may further divide the second frame into a plurality of blocks; determine an average luminance of each of the plurality of blocks; determine a mapping function associated with a predetermined range of the average luminance of each of the plurality of blocks and a count of blocks falling within the predetermined range; and determine the overexposure degree based on the mapping function and an overexposure weight function.

In some embodiments, to determine the total luminance result, the at least one processor may further determine a wide dynamic luminance result based on the high average luminance, the medium average luminance, the low average luminance, and the overexposure degree; determine a wide dynamic weight based on the dynamic range of the current scene; determine an average luminance result based on the high average luminance, the medium average luminance, and the low average luminance; and determine the total luminance result based on the wide dynamic luminance result, the wide dynamic weight, and the average luminance result.

In some embodiments, the at least one processor may further determine first exposure parameters associated with the first frame based on the total luminance result of the current scene.

In some embodiments, to determine the first exposure parameters, the at least one processor may further obtain a target luminance; determine an adjustment direction and an adjustment value of a first shutter associated with the first frame based on the total luminance result and the target luminance; and determine the first exposure parameters based on the adjustment direction, the adjustment value, and current exposure parameters.

In some embodiments, the at least one processor may further determine a second exposure ratio of the current scene based on the dynamic range of the current scene; and determine second exposure parameters associated with the second frame based on the first exposure parameters and the second exposure ratio.

In some embodiments, to determine the second exposure parameters, the at least one processor may further determine a second shutter associated with the second frame, wherein a second aperture and a second gain associated with the second frame are the same as a first aperture and a first gain associated with the first frame, respectively.

In some embodiments, to determine the second shutter, the at least one processor may further determine the second shutter based on the first shutter associated with the first frame and the second exposure ratio of the current scene.

According to another aspect of the present disclosure, a system for automatic exposure control is provided. The system may include at least one storage medium including a set of instructions for automatically adjusting exposure parameters of a camera and at least one processor in communication with the storage medium. When executing the set of instructions, the at least one processor may be directed to: obtain a high average luminance of a high luminance region, a medium average luminance of a medium luminance region, and a low average luminance of a low luminance region in a first frame of a current scene obtained from the camera; obtain an overexposure degree of a second frame of the current scene obtained from the camera; determine a total luminance result of the current scene based on a dynamic range of the current scene, the high average luminance, the medium average luminance, the low average luminance, and the overexposure degree; and determine first exposure parameters associated with the first frame based on the total luminance result of the current scene.

According to still another aspect of the present disclosure, a method for automatic exposure control is provided. The method may include obtaining a first frame and a second frame of a current scene from a camera, wherein a ratio of a first exposure time of the first frame to a second exposure time of the second frame is a first exposure ratio; obtaining a first average luminance of a brightest region in the second frame; obtaining a second average luminance of a darkest region in the first frame; and determining a dynamic range of the current scene based on the first exposure ratio, the first average luminance, and the second average luminance.

According to still another aspect of the present disclosure, a method for automatic exposure control is provided. The method may include obtaining a high average luminance of a high luminance region, a medium average luminance of a medium luminance region, and a low average luminance of a low luminance region in a first frame of a current scene obtained from a camera; obtaining an overexposure degree of a second frame of the current scene obtained from the camera; determining a total luminance result of the current scene based on a dynamic range of the current scene, the high average luminance, the medium average luminance, the low average luminance, and the overexposure degree; and determining first exposure parameters associated with the first frame based on the total luminance result of the current scene.

According to still another aspect of the present disclosure, a non-transitory computer-readable medium, comprising at least one set of instructions compatible for automatic exposure control is provided. When executed by at least one processor of an electrical device, the at least one set of instructions may direct the at least one processor to perform the following operations. The at least one processor may obtain a first frame and a second frame of a current scene from a camera, wherein a ratio of a first exposure time of the first frame to a second exposure time of the second frame is a first exposure ratio; obtain a first average luminance of a brightest region in the second frame; obtaining a second average luminance of a darkest region in the first frame; and determine a dynamic range of the current scene based on the first exposure ratio, the first average luminance, and the second average luminance.

According to still another aspect of the present disclosure, a non-transitory computer-readable medium, comprising at least one set of instructions compatible for automatic exposure control is provided. When executed by at least one processor of an electrical device, the at least one set of instructions may direct the at least one processor to perform the following operations. The at least one processor may obtain a high average luminance of a high luminance region, a medium average luminance of a medium luminance region, and a low average luminance of a low luminance region in a first frame of a current scene obtained from the camera; obtain an overexposure degree of a second frame of the current scene obtained from the camera; determine a total luminance result of the current scene based on a dynamic range of the current scene, the high average luminance, the medium average luminance, the low average luminance, and the overexposure degree; and determine first exposure parameters associated with the first frame based on the total luminance result of the current scene.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
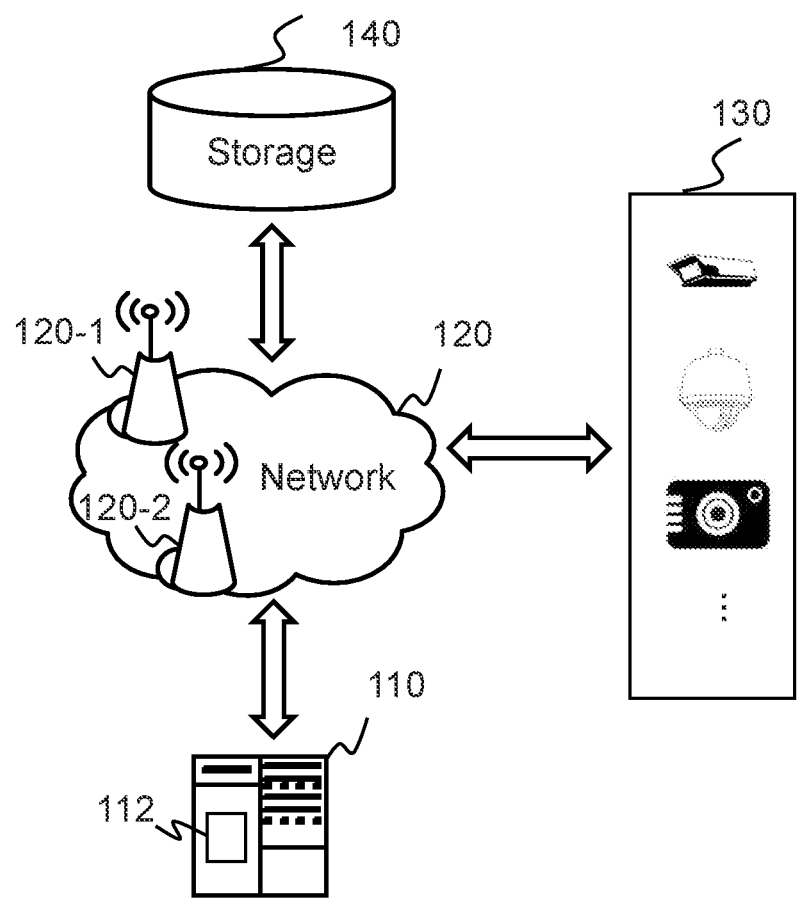
FIG. 1 is a schematic diagram illustrating an exemplary system for automatic exposure control according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for automatic exposure control. To this end, the systems and methods may use dark area in a long-exposure frame and bright area in a short-exposure frame to determine dynamic range of a current scene. The systems and methods may also use the dynamic range of the current scene and luminances of the long-exposure frame and the short-exposure frame to evaluate the luminance of the current scene. The systems and methods may further use the luminance of the current scene and the dynamic range to determine exposure parameters for the long-exposure frame and the short-exposure frame. In this way, the luminance of the current scene is accurate by considering both the long-exposure frame and the short-exposure frame. In addition, by using the exposure parameters for the long-exposure frame and the short-exposure frame, the luminance of the long-exposure frame and the short-exposure frame under the current scene is appropriate. As a result, the systems and methods for automatic exposure control may lead to low synthetic noise and good image quality.

FIG. 1 is a schematic diagram of an exemplary system 100 for automatic exposure control according to some embodiments of the present disclosure. The system 100 may include a server 110, a network 120, a camera 130, and a storage 140.

The server 110 may be configured to process information and/or data relating to automatic exposure control. For example, the server 110 may determine a dynamic range of a current scene. As another example, the server 110 may determine a total luminance result of the current scene. As still another example, the server 110 may determine first exposure parameters associated with a first frame and second exposure parameters associated with a second frame. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the camera 130, and/or the storage 140 via the network 120. As another example, the server 110 may connect the camera 130, and/or the storage 140 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to automatic exposure control. For example, the processing engine 112 may determine a dynamic range of a current scene. As another example, the processing engine 112 may determine a total luminance result of the current scene. As still another example, the processing engine 112 may determine first exposure parameters associated with a first frame and second exposure parameters associated with a second frame. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the system 100 (e.g., the server 110, the camera 130, and the storage 140) may transmit information and/or data to other component(s) in the system 100 via the network 120. For example, the server 110 may obtain the first frame and the second frame of the current scene from the camera 130 via the network 120. As another example, the server 110 may send the first exposure parameters associated with the first frame and the second exposure parameters associated with the second frame to the camera 130 via the network 120. In some embodiments, the network 120 may be any type of wired or wireless network, or combination thereof. Merely by way of example, the network 120 may be a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them.

The camera 130 may be any electronic device that is capable of capturing images or videos. For example, the camera 130 may include an image sensor, a video recorder, or the like, or any combination thereof. In some embodiments, the camera 130 may include any suitable types of camera, such as a fixed camera, a fixed dome camera, a covert camera, a Pan-Tilt-Zoom (PTZ) camera, a thermal camera, or the like, or any combination thereof. In some embodiments, the camera 130 may further include at least one network port. The at least one network port may be configured to send information to and/or receive information from one or more components in the system 100 (e.g., the server 110, the storage 140) via the network 120. In some embodiments, the camera 130 may be implemented on a computing device 200 having one or more components illustrated in FIG. 2, or a mobile device 300 having one or more components illustrated in FIG. 3 in the present disclosure.

The storage 140 may store data and/or instructions. For example, the storage 140 may store data obtained from the camera 130 (e.g., the first frame and the second frame). As another example, the storage 140 may store data (e.g., a dynamic range of the current scene, a total luminance result of the current scene, first exposure parameters associated with the first frame, second exposure parameters associated with the second frame, etc.) relating to the automatic exposure control. As still another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the camera 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the camera 130). In some embodiments, the storage 140 may be part of the server 110.

Figure 2:
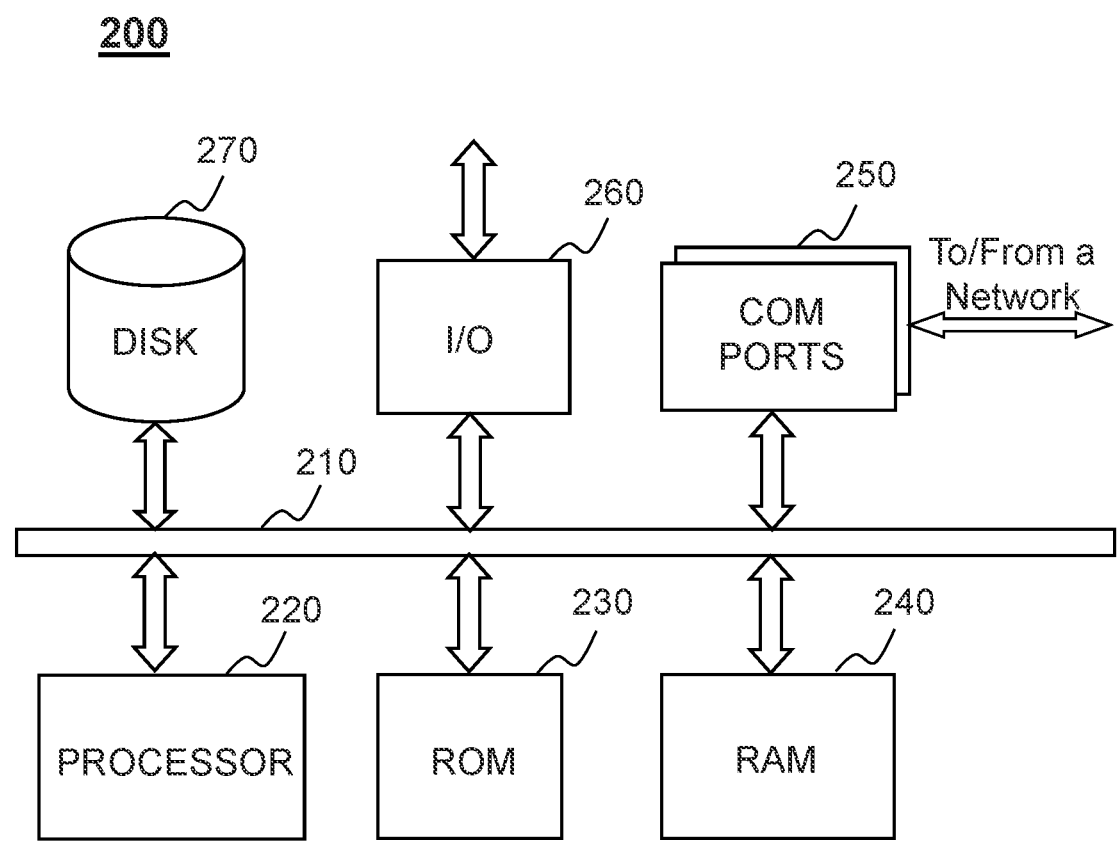
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the camera 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the camera 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
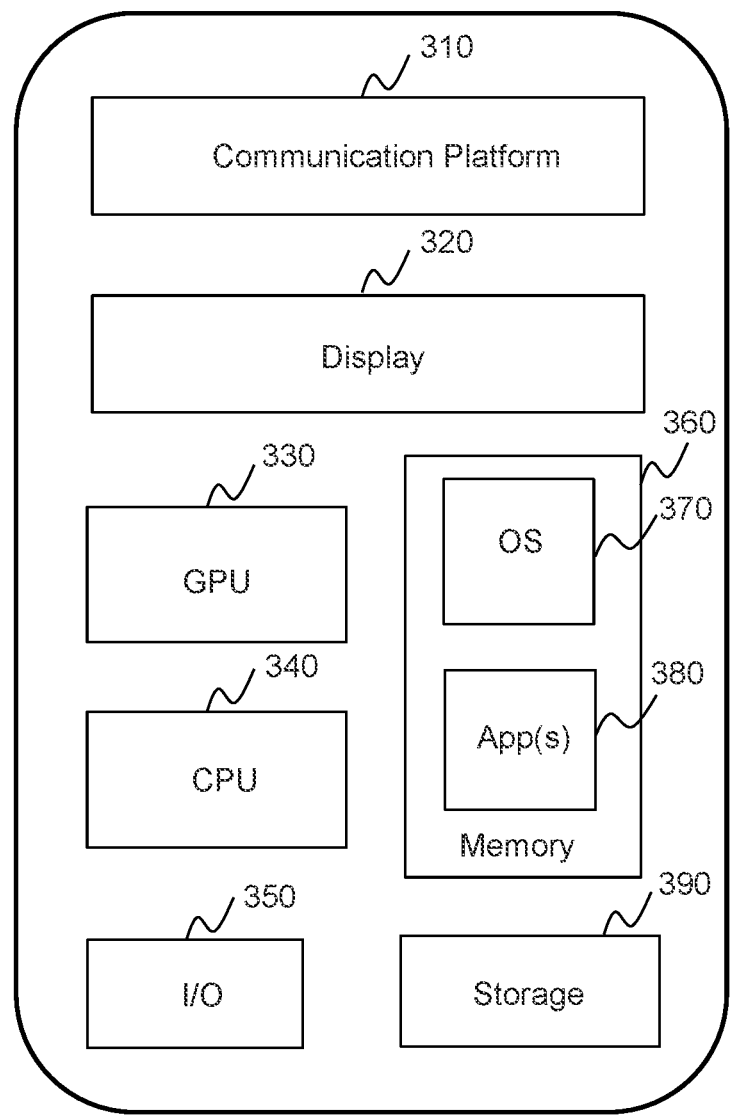
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the server 110 or the camera 130 may be implemented according to some embodiments of the present disclosure.

As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™ Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the route planning service. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-12). The hardware elements, operating systems and programming languages of such computers are conventional in nature, and it is presumed that those skilled in the art are adequately familiar therewith to adapt those technologies to select the best facial image of the target human face as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
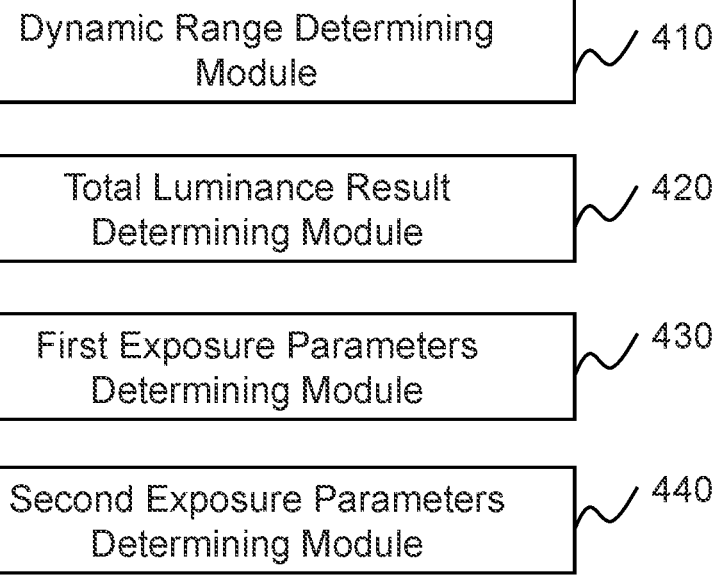
FIG. 4 is a block diagram illustrating an exemplary processing engine according to some embodiments of the present disclosure.

FIG. 4 is a block diagram illustrating an exemplary processing engine 112 according to some embodiments of the present disclosure. As illustrated in FIG. 4, the processing engine 112 may include a dynamic range determining module 410, a total luminance result determining module 420, a first exposure parameters determining module 430, and a second exposure parameters determining module 440.

The dynamic range determining module 410 may be configured to determine a dynamic range of a current scene.

The total luminance result determining module 420 may be configured to determine a total luminance result of the current scene.

The first exposure parameters determining module 430 may be configured to determine first exposure parameters associated with a first frame.

The second exposure parameters determining module 440 may be configured to determine second exposure parameters associated with a second frame.

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the first exposure parameters determining module 430 and the second exposure parameters determining module 440 may be integrated as one module to both determine the first exposure parameters and the second exposure parameters.

Figure 5:
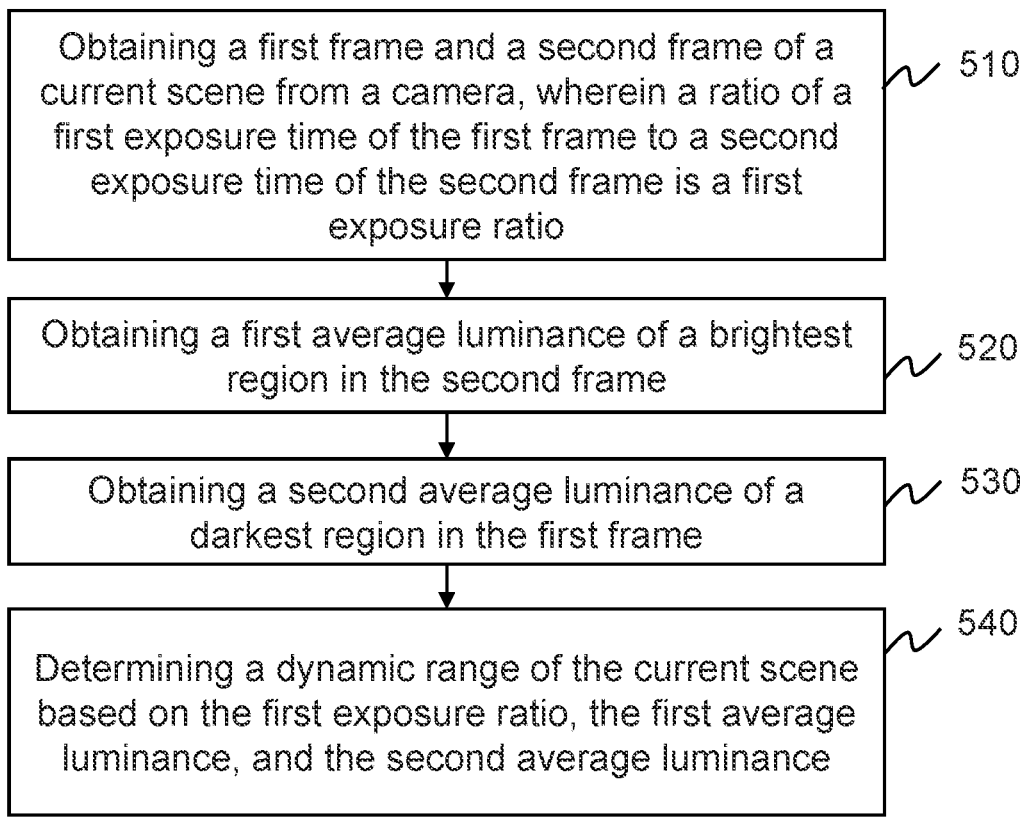
FIG. 5 is a flowchart illustrating an exemplary process for determining a dynamic range of a current scene according to some embodiments of the present disclosure.

FIG. 5 is a flowchart illustrating an exemplary process 500 for determining a dynamic range of a current scene according to some embodiments of the present disclosure. The process 500 may be executed by the system 100. For example, the process 500 may be implemented as a set of instructions (e.g., an application) stored in the storage ROM 230 or the RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the dynamic range determining module 410) may obtain a first frame and a second frame of a current scene from a camera.

In some embodiments, the first frame and the second frame may be two frames that are obtained from the camera by exposing the camera for different time periods. For example, the camera may be a wide-range camera. The wide-range camera may expose two times at the same time. In one of the two times, the wide-range camera may expose for a short time period. In the other of the two times, the wide-range camera may expose for a long time period. In some embodiments, the first frame may be a long-exposure frame that is exposed for a longer time period than the second frame. The second frame may be a short-exposure frame that is exposed for a shorter time period than the first frame. In some embodiments, the processing engine 112 may control the camera to expose for different time periods for capturing the first frame (the long-exposure frame) and the second frame (the short-exposure frame) of the current scene. The processing engine 112 may obtain the first frame (the long-exposure frame) and the second frame (the short-exposure frame) from the camera from the network 120.

In some embodiments, a ratio of a first exposure time of the first frame to a second exposure time of the second frame when capturing the first frame and the second frame may be a first exposure ratio. In some embodiments, the first exposure ratio may be predetermined by the processing engine 112 or an operator thereof. In some embodiments, the first exposure ratio may be a default value and stored in a storage device (e.g., the storage 140, the ROM 230 or the RAM 240, etc.). For example, the first exposure ratio may be 8:1, 16:1, etc.

In 520, the processing engine 112 (e.g., the processor 220, the dynamic range determining module 410) may obtain a first average luminance of a brightest region in the second frame.

In some embodiments, the second frame (the short-exposure frame) may be overall dark due to the short exposure time. Image information of the bright area in the second frame may be effectively retained. The brightest region in the second frame may accurately represent the current scene.

In some embodiments, the processing engine 112 may divide the second frame into a plurality of blocks. For example, the processing engine 112 may evenly divide the second frame into M*N rectangular blocks. In some embodiments, the processing engine 112 may determine an average luminance of each of the plurality of blocks. For example, for the M*N rectangular blocks of the second frame, the processing engine 112 may determine an average luminance of each of the M*N rectangular blocks. In some embodiments, M and N man be an integer greater than 1.

In some embodiments, after determining the average luminance each of the plurality of blocks, the processing engine 112 may rank the plurality of blocks by ranking the values of the plurality of average luminances of the plurality of blocks. In some embodiments, the processing engine 112 may determine the brightest region based on the rank of the plurality of blocks. For example, the processing engine 112 may select a first predetermined number of blocks that have the greatest luminances from the plurality of blocks as the brightest region. In some embodiments, the first predetermined number may be predetermined by the processing engine 112 or an operator thereof, or may be a default value and stored in a storage device (e.g., the storage 140, the ROM 230 or the RAM 240, etc.). For example, the first predetermined number may be one-sixteenth of the total count of the plurality of blocks, one-sixteenth of the total area of the second frame, one-eighth of the total count of the plurality of blocks, one-tenth of the total count of the plurality of blocks, or the like, or any combination thereof.

In some embodiments, the processing engine 112 may determine the first average luminance of the brightest region in the second frame. For example, the processing engine 112 may determine a sum of average luminances of the first predetermined number of blocks of the brightest region and the count of the first predetermined number of blocks. The first average luminance of the brightest region may a value of dividing the sum of the average luminances by the count of the first predetermined number of blocks.

In 530, the processing engine 112 (e.g., the processor 220, the dynamic range determining module 410) may obtain a second average luminance of a darkest region in the first frame.

In some embodiments, the first frame (the long-exposure frame) may be overall bright due to the long exposure time. Image information of the dark area in the first frame may be effectively retained. The darkest region in the first frame may accurately represent the current scene.

In some embodiments, the processing engine 112 may divide the first frame into a plurality of blocks. For example, the processing engine 112 may evenly divide the first frame e into P*Q rectangular blocks. In some embodiments, the processing engine 112 may determine an average luminance of each of the plurality of blocks. For example, for the P*Q rectangular blocks of the first frame, the processing engine 112 may determine an average luminance of each of the P*Q rectangular blocks. In some embodiments, P and Q man be an integer greater than 1. In some embodiments, P and Q may be the same as or different from M and N, respectively.

In some embodiments, after determining the average luminance each of the plurality of blocks, the processing engine 112 may rank the plurality of blocks by ranking the values of the plurality of average luminances of the plurality of blocks. In some embodiments, the processing engine 112 may determine the darkest region based on the rank of the plurality of blocks. For example, the processing engine 112 may select a second predetermined number of blocks that have the lowest luminances from the plurality of blocks as the darkest region. In some embodiments, the second predetermined number may be predetermined by the processing engine 112 or an operator thereof, or may be a default value and stored in a storage device (e.g., the storage 140, the ROM 230 or the RAM 240, etc.). For example, the second predetermined number may be one-sixteenth of the total count of the plurality of blocks, one-sixteenth of the total area of the second frame, one-eighth of the total count of the plurality of blocks, one-tenth of the total count of the plurality of blocks, or the like, or any combination thereof.

In some embodiments, the processing engine 112 may determine the second average luminance of the darkest region in the first frame. For example, the processing engine 112 may determine a sum of average luminances of the second predetermined number of blocks of the brightest region and the count of the second predetermined number of blocks. The first average luminance of the brightest region may a value of dividing the sum of the average luminances by the count of the second predetermined number of blocks.

In 540, the processing engine 112 (e.g., the processor 220, the dynamic range determining module 410) may determine a dynamic range of the current scene based on the first exposure ratio, the first average luminance, and the second average luminance.

In some embodiments, the dynamic range of the current scene may refer to the adaptability of the camera to the scenery in the current scene. For example, the dynamic range may refer to a range of brightness or brightness contrast, and color temperature or color temperature contrast. In some embodiments, the dynamic range may be an adjustment range of the darkest and brightest of the frames captured by the camera. In some embodiments, the dynamic range may be the ratio of the brightest luminance and the darkest luminance in the frames. In some embodiments, the unit of the dynamic range may be decibel, bit, grade, ratio or times, or the like, or any combination thereof.

In some embodiments, the processing engine 112 may determine the dynamic range based on information of the first frame (the long-exposure frame) and the second frame (the short-exposure frame). For example, the bright region in the first frame (the long-exposure frame) may be overexposed, and the dark region in the second frame (the short-exposure frame) may be so dark that it results in large errors. The processing engine 112 may use the darkest region in the first frame and the brightest region in the second frame to determine the dynamic range. For example, the processing engine 112 may determine the dynamic range according to Equation (1):

$$Dr = AverMaxY_S * exp\_ratio / AverMinY_L \qquad (1),$$

wherein Dr denotes the dynamic range, $AverMaxY_S$ denotes the first average luminance in the second frame, $AverMinY_L$ denotes the second average luminance in the first frame, and exp_ratio denotes the first exposure ratio.

In some embodiments, using the darkest region of the first frame and the brightest region of the second frame rather than a single frame, the dynamic range may match with the current scene. In some embodiments, the dynamic range may be further used for determining a total luminance result of the current scene and the exposure parameters for the first frame and the second frame. As a result, the luminances for the first frame and the second frame may be kept in an appropriate range. In addition, the synthetic noise may be reduced and the image quality may be improved.

It should be noted that the above description is merely provided for the purposes of illustration, and not intended to limit the scope of the present disclosure. For persons having ordinary skills in the art, multiple variations and modifications may be made under the teachings of the present disclosure. For example, operations 520 and 530 may be integrated into one step for both obtaining the first average luminance and the second average luminance. As another example, the plurality of blocks may be other shapes, such as circles, irregular shapes, or the like, or any combination thereof.

Figure 6:
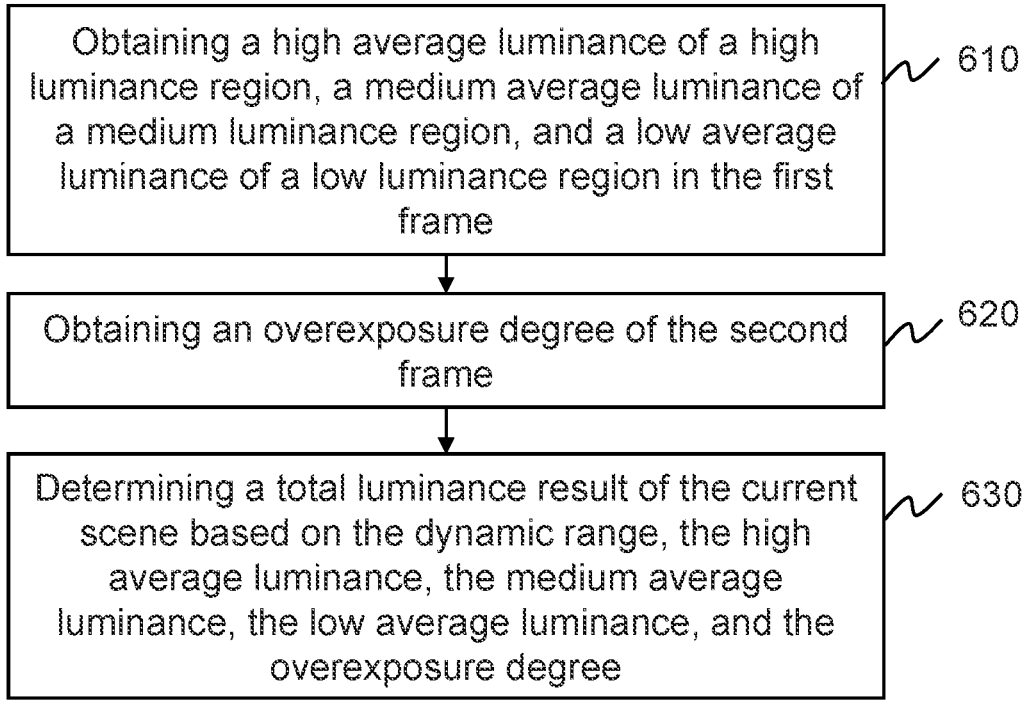
FIG. 6 is a flowchart illustrating an exemplary process for determining a total luminance result of a current scene according to some embodiments of the present disclosure.

FIG. 6 is a flowchart illustrating an exemplary process 600 for determining a total luminance result of a current scene according to some embodiments of the present disclosure. The process 600 may be executed by the system 100. For example, the process 600 may be implemented as a set of instructions (e.g., an application) stored in the storage ROM 230 and/or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the total luminance result determining module 420) may obtain a high average luminance of a high luminance region, a medium average luminance of a medium luminance region, and a low average luminance of a low luminance region in the first frame.

In some embodiment, the high luminance region may be a virtual region that has the highest luminance. For example, the high luminance region may be a sum of a plurality of dispersed blocks that have the highest luminance in the first frame. In some embodiments, the low luminance region may be a virtual region that has the lowest luminance. For example, the low luminance region may be a sum of a plurality of dispersed blocks that have the lowest luminance in the first frame. In some embodiments, the medium luminance region may be a virtual region that has medium luminance. For example, the medium luminance region may be the rest of first frame except for the high luminance region and the low luminance region. In some embodiment, the average luminance of each of the three regions may reflect three levels of luminance in the first frame.

In some embodiments, the processing engine 112 may divide the first frame into a plurality of blocks and determine an average luminance of each of the plurality of blocks. The method for dividing the first frame and/or for determining the average luminance of each block may be the same as the method described in step 530 in the present disclosure. In some embodiments, the processing engine 112 may divide the first frame into three regions (e.g., the high luminance region, the medium luminance region, and the low luminance region) based on the average luminance of each of the plurality of blocks. In some embodiments, the method for determining the three regions (the high luminance region, the low luminance region, and the medium luminance region) may be found elsewhere (e.g., FIG. 7 and the descriptions thereof) in the present disclosure.

In some embodiments, the processing engine 112 may determine an averaged luminance of one of the three regions. For example, the processing engine 112 may determine the high average luminance $Y_h$ of the high luminance region by dividing a sum of the average luminances of the 25% brightest blocks by a count of the 25% brightest blocks. As another example, the processing engine 112 may determine the low average luminance $Y_l$ of the low luminance region by dividing a sum of the average luminances of the 25% darkest blocks by a count of the 25% darkest blocks. As still another example, the processing engine 112 may determine the medium average luminance $Y_m$ of the medium luminance region by dividing a sum of the average luminances of the 50% medium-bright blocks by a count of the 50% medium-bright blocks.

In 620, the processing engine 112 (e.g., the processor 220, the total luminance result determining module 420) may an overexposure degree of the second frame.

In some embodiments, the overexposure degree may be used to evaluate a degree that the sensor of the camera loses information of the current scene in the second frame. The greater the overexposure degree, the more information that the sensor loses in the second frame. The less the overexposure degree, the less information that the sensor loses in the second frame.

In some embodiments, the processing engine 112 may determine the overexposure degree based on the luminance of the second frame. For example, the processing engine 112 may determine a statistical histogram of a plurality of predetermined range of the average luminances of the plurality of blocks and a count of blocks falling within each of the predetermined range. The processing engine 112 may determine the overexposure degree based on the statistical histogram. In some embodiments, the method for determining the overexposure degree may be found elsewhere (e.g., FIG. 8 and the descriptions thereof) in the present disclosure.

In 630, the processing engine 112 (e.g., the processor 220, the total luminance result determining module 420) may determine a total luminance result of the current scene based on the dynamic range, the high average luminance, the medium average luminance, the low average luminance, and the overexposure degree.

In some embodiments, the total luminance result of the current scene may be an index to evaluate the luminance of the current scene. The total luminance result may reflect the luminances of both a bright part and a dark part on the current scene.

In some embodiments, the processing engine 112 may determine the total luminance result based on the dynamic range, the high average luminance, the medium average luminance, the low average luminance, and the overexposure degree. For example, the processing engine 112 may determine a wide dynamic luminance result based on the dynamic range, the high average luminance, the medium average luminance, the low average luminance, and the overexposure degree. The processing engine 112 may further determine an average luminance result based on the high average luminance, the medium average luminance, and the low average luminance. The processing engine 112 may determine the total luminance result based on at least one of the wide dynamic luminance result and the average luminance result. For example, the processing engine 112 may assign a wide dynamic weight for the wide dynamic luminance result. The wide dynamic weight may indicate an importance degree of the wide dynamic luminance result. In some embodiments, the wide dynamic weight may be determined based on the dynamic range. For example, the greater the dynamic range, the greater the wide dynamic weight. As another example, the processing engine 112 may assign an average weight for the average luminance result. The average weight may be a value of subtracting the wide dynamic weight from one. The greater the dynamic range, the less the wide dynamic weight. In some embodiments, the processing engine 112 may select one of the wide dynamic luminance result and the average luminance result as the total luminance result. For example, the processing engine 112 may assign the wide dynamic weight as 1, and the average weight as 0. The processing engine 112 may determine the wide dynamic luminance result as the total luminance result. As another example, the processing engine 112 may assign the wide dynamic weight as 0, and the average weight as 1. The processing engine 112 may determine the average luminance result as the total luminance result. In some embodiments, the method for determining the total luminance result may be found elsewhere (e.g., FIG. 10 and the descriptions thereof) in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 600.

Figure 7:
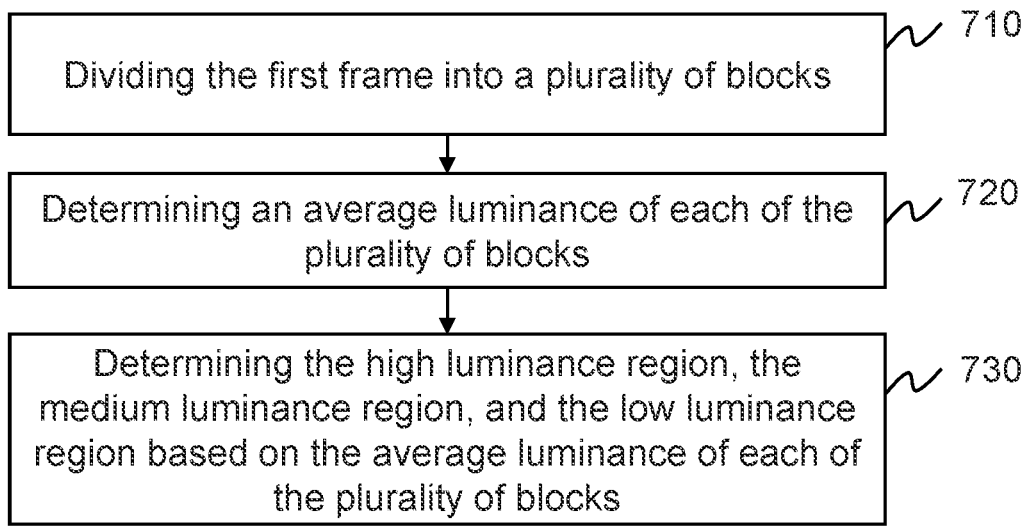
FIG. 7 is a flowchart illustrating an exemplary process for determining a high luminance region, a medium luminance region, and a low luminance region according to some embodiments of the present disclosure.

FIG. 7 is a flowchart illustrating an exemplary process 700 for determining a high luminance region, a medium luminance region, and a low luminance region according to some embodiments of the present disclosure. The process 700 may be executed by the system 100. For example, the process 700 may be implemented as a set of instructions (e.g., an application) stored in the storage ROM 230 or the RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the total luminance result determining module 420) may divide the first frame into a plurality of blocks.

In some embodiments, the method for dividing the first frame into the plurality of blocks may be found elsewhere (e.g., FIG. 5 and the description thereof) in the present disclosure.

In 720, the processing engine 112 (e.g., the processor 220, the total luminance result determining module 420) may determine an average luminance of each of the plurality of blocks.

In some embodiments, the method for determining the average luminance of each of the plurality of blocks may be found elsewhere (e.g., FIG. 5 and the description thereof) in the present disclosure.

In 730, the processing engine 112 (e.g., the processor 220, the total luminance result determining module 420) may determine the high luminance region, the medium luminance region, and the low luminance region based on the average luminance of each of the plurality of blocks.

In some embodiments, the processing engine 112 may rank the plurality of blocks by ranking the average luminance of each of the plurality of blocks in descending order. In some embodiments, the processing engine 112 may select a first predetermined percentage of the plurality of blocks at the top of the rank as the high luminance region. In some embodiments, the processing engine 112 may select a second predetermined percentage of the plurality of blocks at the bottom of the rank as the low luminance region. In some embodiments, the processing engine 112 may determine the rest of the plurality of blocks except for the low luminance region and the high luminance region as the medium luminance region. In some embodiments, the first predetermined percentage and the second predetermined percentage may be predetermined by the processing engine 112 or the operator thereof, or may be a default value and stored in a storage device (e.g., the storage 140, the ROM 230 or the RAM 240, etc.). For example, the processing engine 112 may select 25% brightest blocks from the M*N rectangular blocks as the high luminance region. The processing engine 112 may select 25% darkest blocks from the M*N rectangular blocks having top 25% average luminances among the M*N rectangular blocks as the low luminance region. Other 50% blocks except from the 25% brightest blocks and the 25% darkest blocks may be the medium luminance region. It should be noted that 25%, 50%, and 25% are only for illustration purposes but not to limit the scope of the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 700.

Figure 8:
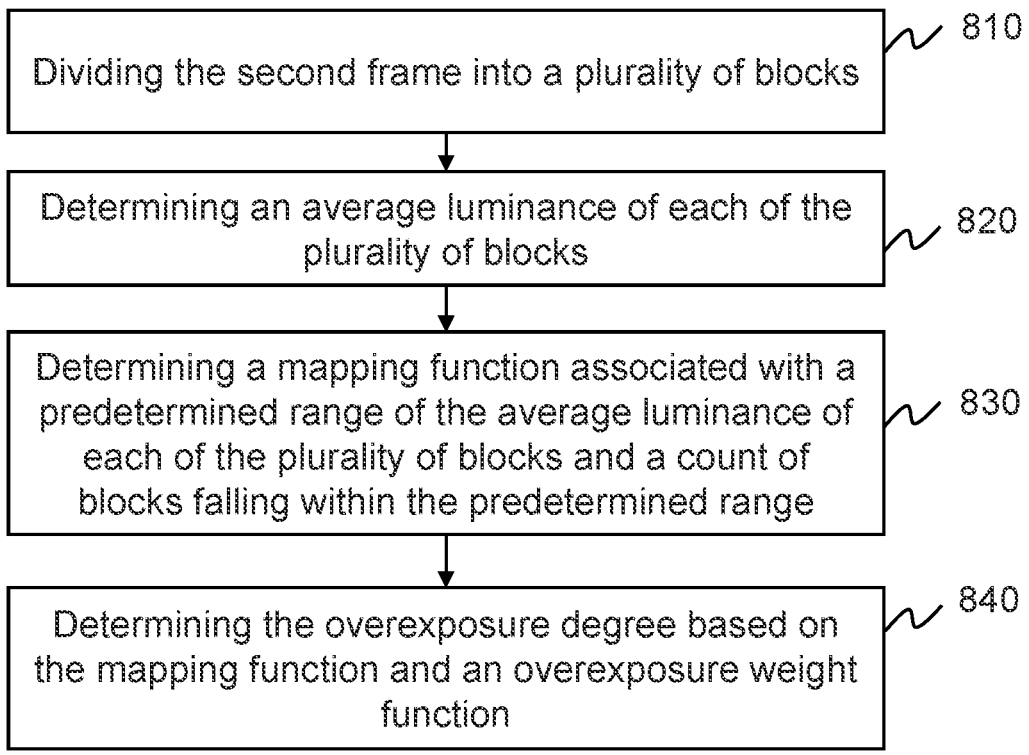
FIG. 8 is a flowchart illustrating an exemplary process for determining an overexposure degree of a second frame according to some embodiments of the present disclosure.

FIG. 8 is a flowchart illustrating an exemplary process 800 for determining an overexposure degree of a second frame according to some embodiments of the present disclosure. The process 800 may be executed by the system 100. For example, the process 800 may be implemented as a set of instructions (e.g., an application) stored in the storage ROM 230 or the RAM 240. The processor 220 may execute the set of instructions, and when executing the instructions, it may be configured to perform the process

800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the total luminance result determining module 420) may divide the second frame into a plurality of blocks.

In 820, the processing engine 112 (e.g., the processor 220, the total luminance result determining module 420) may determine an average luminance of each of the plurality of blocks.

In some embodiments, the method for dividing the first frame into the plurality of blocks and/or for determining the average luminance of each of the plurality of blocks may be found elsewhere (e.g., FIG. 5 and the description thereof) in the present disclosure.

In 830, the processing engine 112 (e.g., the processor 220, the total luminance result determining module 420) may determine a mapping function associated with a predetermined range of the average luminance of each of the plurality of blocks and a count of blocks falling within the predetermined range.

In some embodiments, the mapping function may reflect a proportion of a count of blocks whose average luminances fall within each predetermined range to a total count of the plurality of blocks. For example, the processing engine 112 may determine a statistic histogram. The processing engine 112 may divide the average luminances into a plurality of predetermined ranges. For example, the plurality of predetermined range may be (1-100), (100-200), (200-300), etc. The processing engine 112 may determine a count of blocks whose average luminances fall within (1-100), (100-200), (200-300), respectively as 5, 12, and 10. The X-axis of the statistic histogram may be the plurality of predetermined range, such as (1-100), (100-200), and (200-300). The Y-axis of the statistic histogram may be 5/27, 12/27, and 10/27, respectively. In some embodiments, the processing engine 112 may determine a mathematical function of the statistic histogram as the mapping function.

In 840, the processing engine 112 (e.g., the processor 220, the total luminance result determining module 420) may determine the overexposure degree based on the mapping function and an overexposure weight function.

In some embodiments, the overexposure weight function may reflect an importance degree that each average luminance contributes to the overexposure degree. In some embodiments, the higher the average luminance, the higher the overexposure weight corresponding to the average luminance. In some embodiments, the overexposure weight function may be predetermined by the processing engine 112 or the operator thereof, or may be stored in a storage device (e.g., the storage 140, the ROM 230 or the RAM 240, etc.). For example, the overexposure weight function wo(x) may be determined according to Equation (2):

$$wo(x) = \begin{cases} w1 & x \leq thr1 \\ (w2-w1)^*(x-thr1)/(thr2-thr1) & thr1 < x \leq thr2 \\ (w3-w2)^*(x-thr2)/(thr3-thr2) & thr2 < x \leq thr3 \\ (w4-w3)^*(x-thr3)/(thr4-thr3) & thr3 < x \leq thr4 \\ (w5-w4)^*(x-thr4)/(thr5-thr4) & thr4 < x \leq thr5 \\ w5 & x > thr5 \end{cases} \quad (2)$$

wherein thr1, thr2, thr3, thr4, and thr5 denote five luminance thresholds ranging from 0 to y_max, respectively; y_max denotes a maximum average luminance; w1, w2, w3, w4, and w5 denote five overexposure weights for different ranges of average luminances, respectively; and x denotes an average luminance. In some embodiments, the five overexposure weights w1, w2, w3, w4, and w5 may be a value from 0 to 1.

Figure 9:
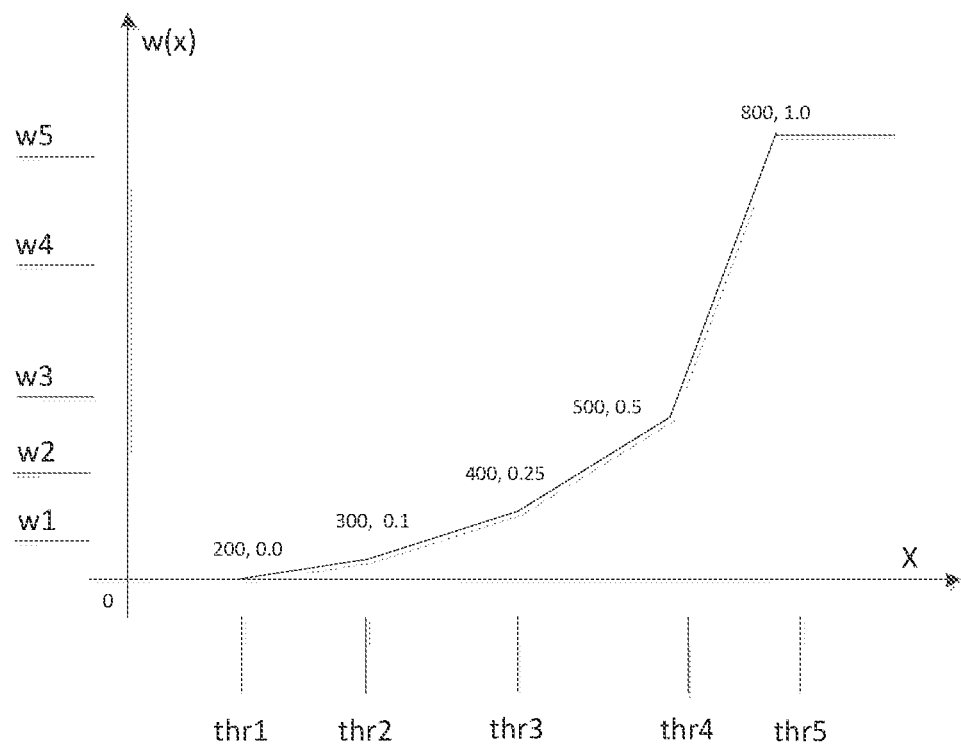
FIG. 9 is a schematic diagram illustrating an exemplary overexposure weight function according to some embodiments of the present disclosure.

FIG. 9 is a schematic diagram illustrating an exemplary overexposure weight function according to some embodiments of the present disclosure. In some embodiments, the overexposure weight function wo(x) may be represented as six broken lines as shown in FIG. 9. As shown in FIG. 9, the greater the average luminance, the greater the overexposure weight. The less the average luminance, the less the overexposure weight. It should be noted that FIG. 9 is merely provided for the purposes of illustration, and not intended to limit the scope of the present disclosure.

In some embodiments, the processing engine 112 may determine the overexposure degree based on the mapping function and the overexposure weight function. For example, the processing engine 112 may determine the overexposure degree over_flow according to Equation (3):

$$\text{over\_flow} = \sum_{j=0}^{Y_{max}} h(j)^* wo(j), \quad (3)$$

wherein h(j) denotes the mapping function; wo(x) denotes the overexposure weight function; and Ymax denotes a maximum value of the average luminances of the plurality of blocks. For example, the second frame may include 10 blocks. There are 2 blocks having average luminance of Y1, the overexposure weight corresponding to the Y1 may be wo(Y1). There are 3 blocks having average luminance of Y2, the overexposure weight corresponding to the Y2 may be wo(Y2). There are 2 blocks having average luminance of Y4, the overexposure weight corresponding to the Y4 may be wo(Y4). There are 2 blocks having average luminance of Y5, the overexposure weight corresponding to the Y5 may be wo(Y5). The overexposure degree over_flow of the second frame may be over_flow=2*wo(Y1)+3*wo(Y2)+1*wo(Y3)+2*wo(Y4)+2*wo(Y5). In some embodiments, the overexposure degree may be determined according to a proportion of a count of blocks fall within each range of average luminance to a total count of blocks. For example, the overexposure degree over_flow of the second frame may be over_flow=0.2*wo(Y1)+0.3*wo(Y2)+0.1*wo(Y3)+0.2*wo (Y4)+0.2*wo(Y5).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 800. For example, the method 800 for determining the overexposure degree of the second frame (the short-exposure frame) may be used for determining an underexposure degree of the first frame (the long-exposure frame).

Figure 10:
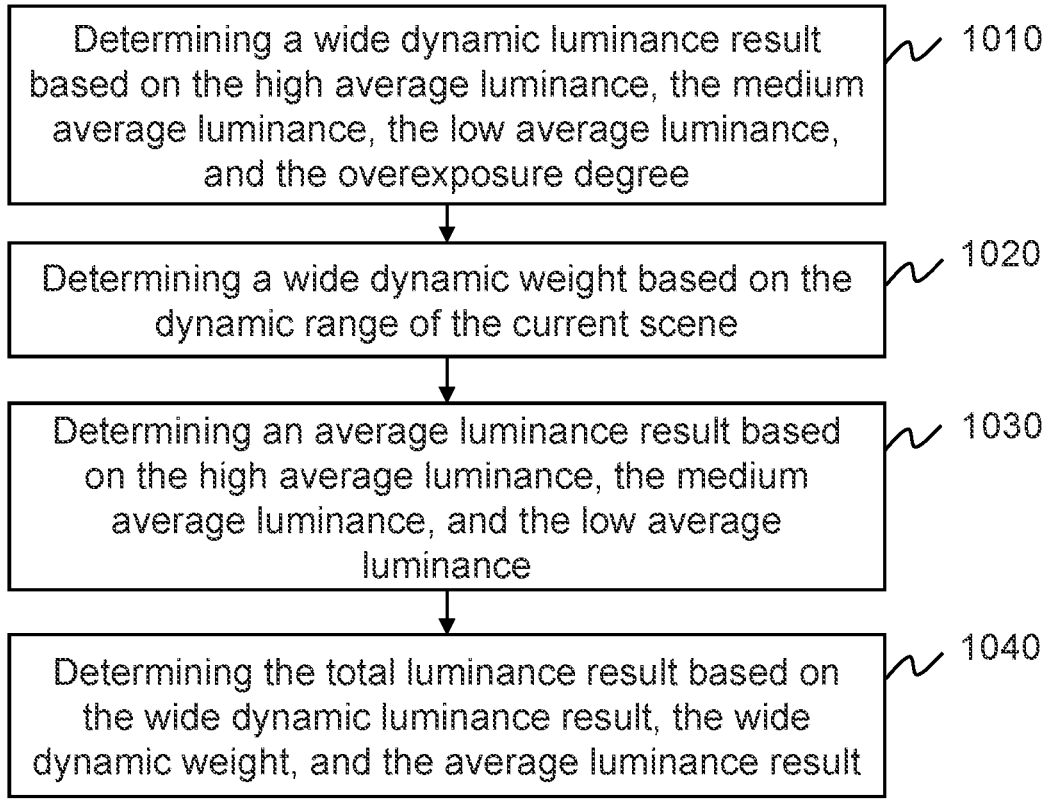
FIG. 10 is a flowchart illustrating an exemplary process for determining a total luminance result according to some embodiments of the present disclosure.

FIG. 10 is a flowchart illustrating an exemplary process 1000 for determining a total luminance result according to some embodiments of the present disclosure. The process 1000 may be executed by the system 100. For example, the process 1000 may be implemented as a set of instructions (e.g., an application) stored in the storage ROM 230 and/or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the total luminance result determining module 420) may determine a wide dynamic luminance result based on the high average luminance, the medium average luminance, the low average luminance, and the overexposure degree.

In some embodiments, the wide dynamic luminance result may reflect a luminance result of a frame using the high average luminance of the high luminance region, the medium average luminance of the medium luminance region, and the low average luminance of the low luminance region. In some embodiments, the processing engine 112 may determine a luminance weight for each of the high luminance region, the medium luminance region, and the low luminance region based on the overexposure degree. For example, the processing engine 112 may determine a luminance weight $w_m$ for the low luminance region according to Equation (4):

$$w_l = 0.25 * k_l(\text{over\_flow}) \qquad (4),$$

wherein $k_l$ (over_flow) denotes a mapping function between the overexposure degree over_flow and the corresponding luminance weight of the low luminance region. The X-axis of the mapping function $k_l$ (over_flow) may be the overexposure degree over_flow, and the Y-axis may be the luminance weight. In some embodiments, the mapping function $k_l$ (over_flow) may be predetermined by the processing engine 112 or the operator thereof, or may be stored in a storage device (e.g., the storage 140, the ROM 230 or the RAM 240, etc.). For example, the expression of the mapping function $k_l$ (over_flow) may be the same as the overexposure weight function wo(x) as shown in FIG. 9. As another example, the processing engine 112 may determine a luminance weight $w_m$ for the medium luminance region according to Equation (5):

$$w_m = 0.5 \qquad (5).$$

As still another example, the processing engine 112 may determine a luminance weight $w_h$ for the high luminance region according to Equation (6):

$$w_h = 0.25 * k_h(\text{over\_flow}) \qquad (6),$$

wherein $k_h$ (over_flow) denotes a mapping function between the overexposure degree over_flow and the corresponding luminance weight of the high luminance region. The X-axis of the mapping function $k_h$ (over_flow) may be the overexposure degree over_flow, and the Y-axis may be the luminance weight. In some embodiments, the mapping function $k_h$ (over_flow) may be predetermined by the processing engine 112 or the operator thereof, or may be stored in a storage device (e.g., the storage 140, the ROM 230 or the RAM 240, etc.). For example, the expression of the mapping function $k_h$ (over_flow) may be the same as the overexposure weight function wo(x) as shown in FIG. 9.

In some embodiments, the processing engine 112 may determine the wide dynamic luminance result based on the high average luminance, the medium average luminance, the low average luminance, and the luminance weight for each of the high luminance region, the medium luminance region, and the low luminance region. For example, the processing engine 112 may determine the wide dynamic luminance result EVw according to Equation (7):

$$EV_w = (w_l * Y_l + w_m * Y_m + w_h * Y_h)/(w_l + w_m + w_h) \qquad (7),$$

wherein $Y_l$, $Y_m$, and $Y_h$ denote the high average luminance, the medium average luminance, the low average luminance of the high luminance region, the medium luminance region, and the low luminance region, respectively; $w_l$, $w_m$, and $w_h$ denote the luminance weight for the high luminance region, the medium luminance region, and the low luminance region, respectively.

In 1020, the processing engine 112 (e.g., the processor 220, the total luminance result determining module 420) may determine a wide dynamic weight based on the dynamic range of the current scene.

In some embodiments, the wide dynamic weight may reflect an importance degree that the wide dynamic luminance result contributes to the total luminance result. The greater the wide dynamic weight, the more important the wide dynamic luminance result contributes to the total luminance result. In some embodiments, the processing engine 112 may determine the wide dynamic weight based on a mapping relationship between the dynamic range of the current scene and the wide dynamic weight. For example, the processing engine 112 may determine the wide dynamic weight $w_w$ according to Equation (8):

$$w_w = h(Dr) \qquad (8),$$

wherein h(Dr) denotes a mapping relationship between the dynamic range and the wide dynamic weight. In some embodiments, the mapping relationship h(Dr) may be predetermined by the processing engine 112 or the operator thereof, or may be stored in a storage device (e.g., the storage 140, the ROM 230 or the RAM 240, etc.). For example, the expression of the mapping relationship h(Dr) may be the same as the overexposure weight function wo(x) as shown in FIG. 9. In some embodiments, the greater the dynamic range, the greater the wide dynamic weight.

In 1030, the processing engine 112 (e.g., the processor 220, the total luminance result determining module 420) may determine an average luminance result based on the high average luminance, the medium average luminance, and the low average luminance.

In some embodiments, the average luminance result may reflect an average luminance result of a frame. For example, the processing engine 112 may determine the average luminance result $EV_a$ according to Equation (9):

$$EV_a = (Y_l + Y_m + Y_h)/3 \qquad (9),$$

wherein $Y_l$, $Y_m$, and $Y_h$ denotes the high average luminance, the medium average luminance, the low average luminance of the high luminance region, the medium luminance region, and the low luminance region, respectively.

In 1040, the processing engine 112 (e.g., the processor 220, the total luminance result determining module 420) may determine the total luminance result based on the wide dynamic luminance result, the wide dynamic weight, and the average luminance result.

In some embodiments, the total luminance result may be used to evaluate a luminance of the current scene. In some embodiment, the processing engine 112 may determine the total luminance result EV based on the wide dynamic luminance result, the wide dynamic weight, and the average luminance result according to Equation (10):

$$EV = w_w * EV_w + (1-w_w) * EV_a \quad (10),$$

wherein $w_w$ denotes the wide dynamic weight, $EV_w$ denotes the wide dynamic luminance result, and $EV_a$ denotes the average luminance result. In some embodiments, the wide dynamic weight $w_w$ may be a value ranges from 0 to 1. For example, the wide dynamic weight $w_w$ may be 0. The total luminance result EV may equal to the average luminance result $EV_a$. As another example, the wide dynamic weight $w_w$ may be 1. The total luminance result EV may equal to the wide dynamic luminance result $EV_w$. As still another example, the wide dynamic weight $w_w$ may be 0.5. The total luminance result EV may equal to half of the wide dynamic luminance result $EV_w$ plus half of the average luminance result $EV_a$.

In some embodiments, the total luminance result determined based on the wide dynamic luminance result and/or the average luminance result may be accurate to evaluate the luminance of the current scene. The total luminance result may match with the current scene.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1000.

Figure 11:
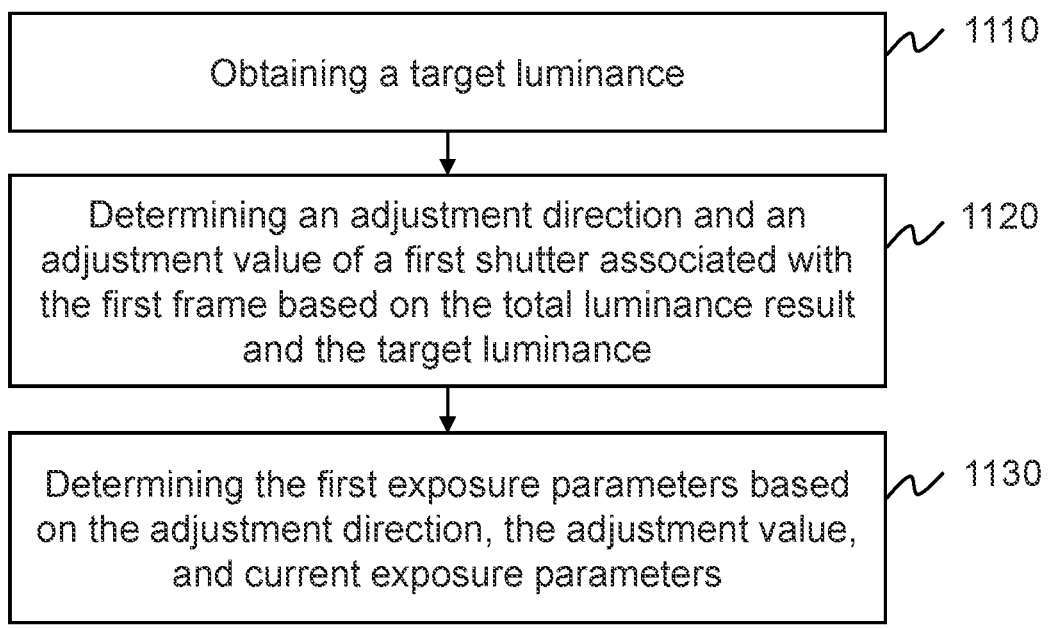
FIG. 11 is a flowchart illustrating an exemplary process for determining first exposure parameters associated with a first frame according to some embodiments of the present disclosure.

FIG. 11 is a flowchart illustrating an exemplary process 1100 for determining first exposure parameters associated with a first frame according to some embodiments of the present disclosure. The process 1100 may be executed by the system 100. For example, the process 1100 may be implemented as a set of instructions (e.g., an application) stored in the storage ROM 230 and/or RAM 240. The processor 220 may execute the set of instructions, and when executing the instructions, it may be configured to perform the process 1100. The operations of the illustrated process presented below are intended to be illustrative. In some embodiments, the process 1100 may be accomplished with one or more additional operations not described and/or without one or more of the operations discussed. Additionally, the order in which the operations of the process as illustrated in FIG. 11 and described below is not intended to be limiting.

In 1110, the processing engine 112 (e.g., the processor 220, the first exposure parameters determining module 430) may obtain a target luminance.

In some embodiments, the target luminance may be a luminance that a user prefers. For example, the user of the camera may prefer a brighter image than a darker image. The target luminance may be an average luminance that the user prefers when using the camera. In some embodiments, the target luminance may be predetermined by the user or may be a default value stored in a storage device (e.g., the storage 140, the ROM 230 or the RAM 240, etc.). In some embodiments, the processing engine 112 may determine the target luminance using historical using data of the user. For example, the target luminance may be determined according to a machine learning method trained by the historical using data of the user.

In 1120, the processing engine 112 (e.g., the processor 220, the first exposure parameters determining module 430) may determine an adjustment direction and an adjustment value of a first shutter associated with the first frame based on the total luminance result and the target luminance.

In some embodiments, the adjustment direction may be a direction to increase or reduce the luminance that the sensor of the camera obtains. In some embodiments, the adjustment value of the first shutter associated with the first frame may be a value that is adjusted on the first shutter to change the luminance that the sensor of the camera obtains when capturing the first frame.

In some embodiments, the processing engine 112 may compare the total luminance result with the target luminance. For example, if the total luminance result is less than the target luminance, the processing engine 112 may determine that the luminance is not enough. The processing engine 112 may increase the luminance of the camera. The adjustment direction may be a direction to increase the luminance. In some embodiments, the processing engine 112 may determine the adjustment value of the first shutter according to changing the step sizes to approximate the target luminance. For example, if the difference between the total luminance result and the target luminance is large, the adjustment value of the first shutter may be large. As another example, if the difference between the total luminance result and the target luminance is small, the adjustment value of the first shutter may be small.

In 1130, the processing engine 112 (e.g., the processor 220, the first exposure parameters determining module 430) may determine the first exposure parameters based on the adjustment direction, the adjustment value, and current exposure parameters.

In some embodiments, the first exposure parameters may indicate values associated with the luminance that the sensor obtains when capturing the first frame. For example, the first exposure parameters may include an aperture value of the sensor, a shutter value of the sensor, a gain of the sensor, or the like, or any combination thereof, when capturing the first frame.

In some embodiments, the processing engine 112 may determine a currently needed exposure value that the sensor needs when capturing the first frame based on the adjustment direction, the adjustment value, and the current exposure parameters. For example, the currently needed exposure value may be an exposure value after adjusting the adjustment value along the adjustment direction on the current exposure value. The current exposure value may be determined based on the current exposure parameters. In some embodiments, if the adjustment direction is a direction to reduce the luminance, the currently needed exposure value may be a value obtained by subtracting the current exposure value by the adjustment value. IF the adjustment direction is a direction to increase the luminance, the currently needed exposure value may be a value obtained by adding the current exposure value to the adjustment value. In some embodiments, the processing engine 112 may determine the first exposure parameters including the aperture value of the sensor, the shutter value of the sensor, and the gain of the sensor when capturing the first frame based on the current needed exposure value.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1100.

Figure 12:
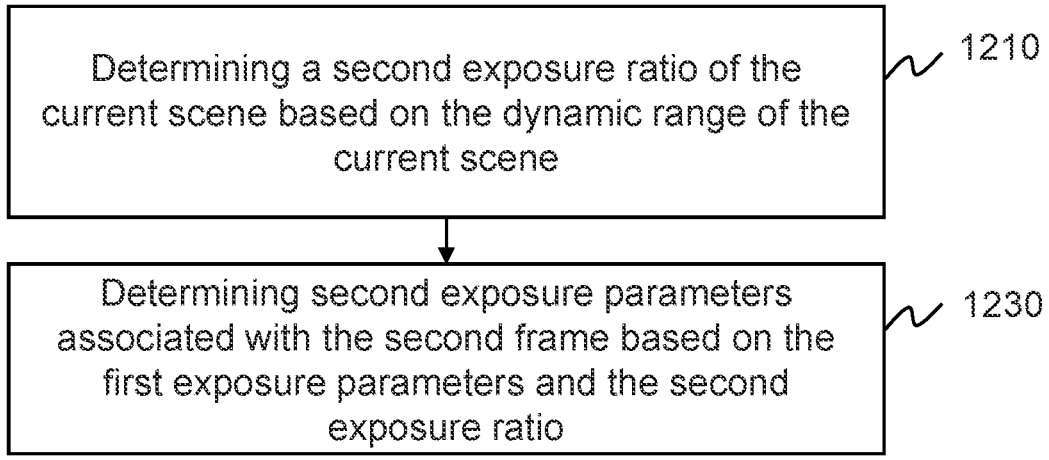
FIG. 12 is a flowchart illustrating an exemplary process for determining second exposure parameters associated with a second frame according to some embodiments of the present disclosure.

FIG. 12 is a flowchart illustrating an exemplary process 1200 for determining second exposure parameters associated with a second frame according to some embodiments of the present disclosure. The process 1200 may be executed by the system 100. For example, the process 1200 may be implemented as a set of instructions (e.g., an application) stored in the storage ROM 230 and/or RAM 240. The processor 220 may execute the set of instructions, and when executing the instructions, it may be configured to perform the process 1200. The operations of the illustrated process presented below are intended to be illustrative. In some embodiments, the process 1200 may be accomplished with one or more additional operations not described and/or without one or more of the operations discussed. Additionally, the order in which the operations of the process as illustrated in FIG. 12 and described below is not intended to be limiting.

In 1210, the processing engine 112 (e.g., the processor 220, the second exposure parameters determining module 440) may determine a second exposure ratio of the current scene based on the dynamic range of the current scene.

In some embodiments, the second exposure ratio of the current scene may be a ratio of exposure time of the first frame to the second frame that the sensor may be adjusted. In some embodiments, the processing engine 112 may determine the second exposure ratio according to Equation (11):

$$\text{exp\_ratio}' = r(Dr) \quad (11),$$

wherein exp_ratio' denotes the second exposure ratio; r(Dr) denotes a mapping relationship between the dynamic range Dr of the current scene and the second exposure ratio. In some embodiments, the mapping relationship r(Dr) may be predetermined by the processing engine 112 or the operator thereof, or may be stored in a storage device (e.g., the storage 140, the ROM 230 or the RAM 240, etc.). For example, the expression of the mapping relationship r(Dr) may be the same as the overexposure weight function wo(x) as shown in FIG. 9. In some embodiments, the greater the dynamic range, the greater the second exposure ratio.

In 1220, the processing engine 112 (e.g., the processor 220, the second exposure parameters determining module 440) may determine second exposure parameters associated with the second frame based on the first exposure parameters and the second exposure ratio.

In some embodiments, the second exposure parameters may indicate values associated with the luminance that the sensor obtains when capturing the second frame. For example, the second exposure parameters may include an aperture value of the sensor, a shutter value of the sensor, a gain of the sensor, or the like, or any combination thereof, when capturing the second frame.

In some embodiments, the processing engine 112 may determine a second shutter when capturing the second frame based on the first shutter and the second exposure ratio. For example, the second shutter may be a value of dividing the first shutter by the second exposure ratio. In some embodiments, in order to avoid image flickers resulted by changing the second shutter when capturing the second frame, the processing engine 112 may further add a smooth filtering on the second shutter. The user experience may be improved.

In some embodiments, other second exposure parameters, such as a second aperture and a second gain when capturing the second frame may be the same with the first aperture and the first gain when capturing the first frame, respectively.

In some embodiments, the processing engine 112 may send the first exposure parameters and the second exposure parameters to the sensor of the camera. The processing engine 112 may automatically adjust the aperture, the gain, and the shutter of the sensor based on the first exposure parameters and the second exposure parameters when capturing the first frame (the long-exposure frame) and the second frame (the short-exposure frame).

In some embodiments, the second exposure ratio is dynamically adjusted by the dynamic range of the current scene. The dynamic range matches with the current scene. The sensor of the camera remains appropriate luminances when capturing the first frame and the second frame. The automatic exposure control according to the present disclosure results in low synthetic noise and good image quality.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more other optional operations (e.g., a storing operation) may be added elsewhere in the exemplary process 1200.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for automatic exposure control, comprising:
   at least one storage medium including a set of instructions for automatically adjusting exposure parameters of a camera; and
   at least one processor in communication with the storage medium, wherein when executing the set of instructions, the at least one processor is directed to:
      obtain a first frame and a second frame of a current scene from the camera, wherein a ratio of a first exposure time of the first frame to a second exposure time of the second frame is a first exposure ratio;
      obtain a first average luminance of a brightest region in the second frame;
      obtain a second average luminance of a darkest region in the first frame;
      determine a dynamic range of the current scene based on the first exposure ratio, the first average luminance, and the second average luminance;
      obtain a high average luminance of a high luminance region, a medium average luminance of a medium luminance region, and a low average luminance of a low luminance region in the first frame;
      obtain an overexposure degree of the second frame; and
      determine a total luminance result of the current scene based on the dynamic range, the high average luminance, the medium average luminance, the low average luminance, and the overexposure degree.

2. The system of claim 1, wherein the at least one processor is further directed to:
divide the first frame into a plurality of blocks;
determine an average luminance of each of the plurality of blocks; and
obtain the high luminance region, the medium luminance region, and the low luminance region based on the average luminance of each of the plurality of blocks.

3. The system of claim 1, wherein to obtain the overexposure degree, the at least one processor is further directed to:
divide the second frame into a plurality of blocks;
determine an average luminance of each of the plurality of blocks;
determine a mapping function associated with a predetermined range of the average luminance of each of the plurality of blocks and a count of blocks falling within the predetermined range; and
determine the overexposure degree based on the mapping function and an overexposure weight function.

4. The system of claim 1, wherein to determine the total luminance result, the at least one processor is directed to:
determine a wide dynamic luminance result based on the high average luminance, the medium average luminance, the low average luminance, and the overexposure degree;
determine a wide dynamic weight based on the dynamic range of the current scene;
determine an average luminance result based on the high average luminance, the medium average luminance, and the low average luminance; and
determine the total luminance result based on the wide dynamic luminance result, the wide dynamic weight, and the average luminance result.

5. The system of claim 1, wherein the at least one processor is directed to:
determine first exposure parameters associated with the first frame based on the total luminance result of the current scene.

6. The system of claim 5, wherein to determine the first exposure parameters, the at least one processor is directed to:
obtain a target luminance;
determine an adjustment direction and an adjustment value of a first shutter associated with the first frame based on the total luminance result and the target luminance; and
determine the first exposure parameters based on the adjustment direction, the adjustment value, and current exposure parameters.

7. The system of claim 5, wherein the at least one processor is further directed to:
determine a second exposure ratio of the current scene based on the dynamic range of the current scene; and
determine second exposure parameters associated with the second frame based on the first exposure parameters and the second exposure ratio.

8. The system of claim 7, wherein to determine the second exposure parameters, the at least one processor is directed to:
determine a second shutter associated with the second frame, wherein a second aperture and a second gain associated with the second frame are the same as a first aperture and a first gain associated with the first frame, respectively.

9. The system of claim 8, wherein to determine the second shutter, the at least one processor is directed to:
determine the second shutter based on the first shutter associated with the first frame and the second exposure ratio of the current scene.

10. A system for automatic exposure control, comprising:
at least one storage medium including a set of instructions for automatically adjusting exposure parameters of a camera; and
at least one processor in communication with the storage medium, wherein when executing the set of instructions, the at least one processor is directed to:
obtain a high average luminance of a high luminance region, a medium average luminance of a medium luminance region, and a low average luminance of a low luminance region in a first frame of a current scene obtained from the camera;
obtain an overexposure degree of a second frame of the current scene obtained from the camera;
determine a total luminance result of the current scene based on a dynamic range of the current scene, the high average luminance, the medium average luminance, the low average luminance, and the overexposure degree;
determine first exposure parameters associated with the first frame based on the total luminance result of the current scene;
obtain a high average luminance of a high luminance region, a medium average luminance of a medium luminance region, and a low average luminance of a low luminance region in the first frame;
obtain an overexposure degree of the second frame; and
determine a total luminance result of the current scene based on the dynamic range, the high average luminance, the medium average luminance, the low average luminance, and the overexposure degree.

11. A method for automatic exposure control, comprising:
obtaining a first frame and a second frame of a current scene from a camera, wherein a ratio of a first exposure time of the first frame to a second exposure time of the second frame is a first exposure ratio;
obtaining a first average luminance of a brightest region in the second frame;
obtaining a second average luminance of a darkest region in the first frame;
determining a dynamic range of the current scene based on the first exposure ratio, the first average luminance, and the second average luminance;
obtaining a high average luminance of a high luminance region, a medium average luminance of a medium luminance region, and a low average luminance of a low luminance region in the first frame;
obtaining an overexposure degree of the second frame; and
determining a total luminance result of the current scene based on the dynamic range, the high average luminance, the medium average luminance, the low average luminance, and the overexposure degree.

12. The method of claim 11, further comprising:
dividing the first frame into a plurality of blocks;
determining an average luminance of each of the plurality of blocks; and
obtaining the high luminance region, the medium luminance region, and the low luminance region based on the average luminance of each of the plurality of blocks.

13. The method of claim 11, wherein the obtaining the overexposure degree includes:
dividing the second frame into a plurality of blocks;
determining an average luminance of each of the plurality of blocks;
determining a mapping function associated with a predetermined range of the average luminance of each of the plurality of blocks and a count of blocks falling within the predetermined range; and
determining the overexposure degree based on the mapping function and an overexposure weight function.

14. The method of claim 11, wherein the determining the total luminance result includes:
determining a wide dynamic luminance result based on the high average luminance, the medium average luminance, the low average luminance, and the overexposure degree;
determining a wide dynamic weight based on the dynamic range of the current scene;
determining an average luminance result based on the high average luminance, the medium average luminance, and the low average luminance; and
determining the total luminance result based on the wide dynamic luminance result, the wide dynamic weight, and the average luminance result.

15. The method of claim 11, further comprising:
determining first exposure parameters associated with the first frame based on the total luminance result of the current scene.

16. The method of claim 15, wherein the determining the first exposure parameters includes:
obtaining a target luminance;
determining an adjustment direction and an adjustment value of a first shutter associated with the first frame based on the total luminance result and the target luminance; and
determining the first exposure parameters based on the adjustment direction, the adjustment value, and current exposure parameters.

17. The method of claim 15, further comprising:
determining a second exposure ratio of the current scene based on the dynamic range of the current scene; and
determining second exposure parameters associated with the second frame based on the first exposure parameters and the second exposure ratio.

18. The method of claim 17, wherein the determining the second exposure parameters includes:
determining a second shutter associated with the second frame, wherein a second aperture and a second gain associated with the second frame are the same as a first aperture and a first gain associated with the first frame, respectively.

* * * * *